No. 718,119. PATENTED JAN. 13, 1903.
M. H. GOODWIN.
STOVEPIPE FASTENER.
APPLICATION FILED JULY 19, 1901.

NO MODEL.

Witnesses.
C. A. Goodwin
M. W. Gilmore

Inventor.
Millard H. Goodwin

UNITED STATES PATENT OFFICE.

MILLARD H. GOODWIN, OF TOPEKA, KANSAS.

STOVEPIPE-FASTENER.

SPECIFICATION forming part of Letters Patent No. 718,119, dated January 13, 1903.

Application filed July 19, 1901. Serial No. 68,952. (No model.)

*To all whom it may concern:*

Figure 3:
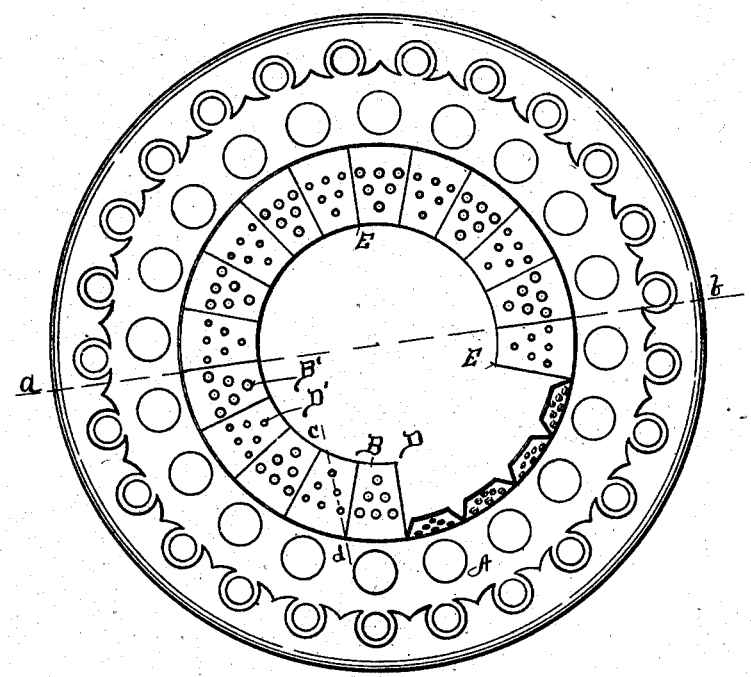
Figure 4:
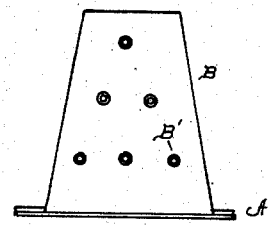
Figures 2, 5:
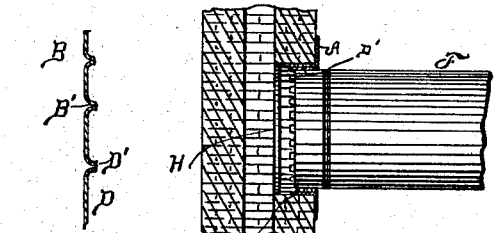
Figure 1:
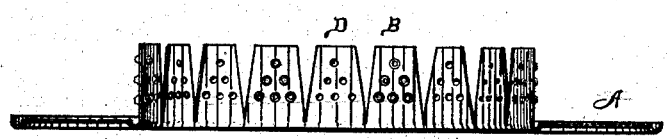

Be it known that I, MILLARD H. GOODWIN, a citizen of the United States, residing at Topeka, in the county of Shawnee and State of Kansas, have invented certain new and useful Improvements in Stovepipe-Fasteners; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention consists of a mechanical device that will tend to firmly hold a stovepipe in its place in a chimney-thimble, the object being to prevent the annoyance and danger of the said stovepipe coming out through jarring created by various causes, and also to save the labor, expense, and unsightliness of wiring the said pipe into place. I attain these objects by the device illustrated in the accompanying drawings, in which—
Figure 1 is a transverse section taken through the line *a b* of Fig. 3. Fig. 2 is an enlarged section taken through the line *c d* of Fig. 3. Fig. 3 is a plan view showing the stamping and ornamentation. Fig. 4 is an enlarged plan view of one of the fastening-leaves, and Fig. 5 is a section showing the appliance in place in a chimney.

Similar letters refer to similar parts throughout the several views.
The fastener A as a whole is preferably made of a circular piece of tin or thin galvanized iron. When devised for a six-inch stovepipe, a center of about three inches in diameter is punched out, as shown in Fig. 3, leaving one and one-half inches each side of the opening, which is divided into the leaves B D. Each alternate leaf B' D' is prick-punched, one set from the face side of the fastener A and one set from the back of said fastener, thus creating a series of sharp ragged points projecting both from the face and back of the plate A. The leaves B D are cut on the lines E and are then formed at right angles with the face of the fastener A, as shown at Fig. 1, when the said fastener is ready for use.

In use the fastener as formed is forced into the thimble H, as shown in Fig. 5, when the small end of the stovepipe F is forced into the fastener, forcing the points D' of the leaves B D to engage both the thimble H and the pipe F, holding the said pipe securely and firmly in place and rendering it safe from jarring loose, thus preventing the necessity of using wire or any like means for holding the pipe F in place.

Having thus described my invention, what I claim as new, and desire to secure by Letters Patent, is—

A stovepipe-fastener comprising a substantially annular sheet-metal plate provided with integral radial leaves on its inner periphery, a set of said leaves having projections struck up from one side thereof and another set, alternating with the first set, having projections struck up from the opposite side, substantially as described and for the purposes specified.

In testimony whereof I affix my signature in the presence of two witnesses.

MILLARD H. GOODWIN.

Witnesses:
   C. N. FRAGER,
   C. G. GOODWIN.